Oct. 15, 1935. E. F. HAUSERMAN ET AL Re. 19,722

WALL SUPPORT STRUCTURE

Original Filed Sept. 7, 1926

INVENTOR.
Earl F. Hauserman,
Leroy H. Mowery and
BY John A. Bohnsack.
Fay, Oberlin & Fay
ATTORNEYS.

Reissued Oct. 15, 1935 Re. 19,722

UNITED STATES PATENT OFFICE 19,722

WALL-SUPPORT STRUCTURE

Earl F. Hauserman, Cleveland Heights, Leroy D. Mowery, Cleveland, and John A. Bohnsack, Cleveland Heights, Ohio, assignors to The E. F. Hauserman Company, Cleveland, Ohio, a corporation of Ohio Original No. 1,725,349, dated August 20, 1929, Serial No. 134,112, September 7, 1926. Reissue No. 17,547, dated December 31, 1929, Serial No. 404,187, October 29, 1929. This application for reissue February 18, 1935, Serial No. 7,152

7 Claims. (Cl. 189—34)

This invention relates to wall assembly, and more particularly to construction adaptable to interior use in partitions, etc., and it is among the objects of the invention to provide a construction which may be readily assembled or disassembled, and which does not necessarily require bolts or screws. Other objects and advantages will appear as the description proceeds.

To the accomplishment of the foregoing and related ends, the invention, then, consists in the features hereinafter fully described, and particularly pointed out in the claims.

The annexed drawing and the following description set forth in detail certain structure embodying the invention, such disclosed means constituting, however, but a few of the various ways in which the principle of the invention may be used.

In said annexed drawing:—

Figure 1:
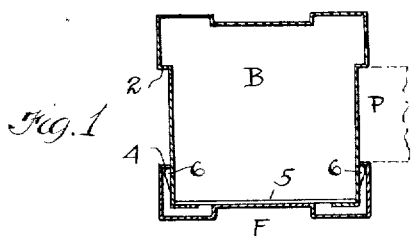
Figure 2:
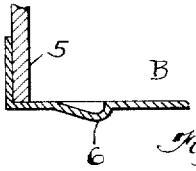
Figure 3:
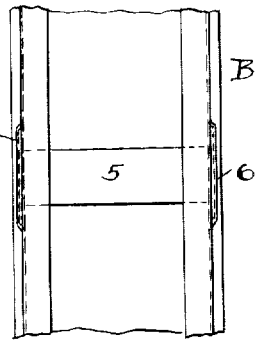
Figure 4:
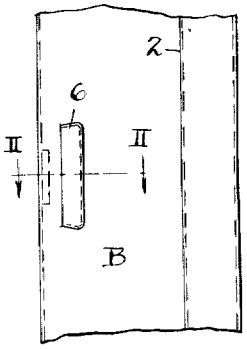
Figure 5:
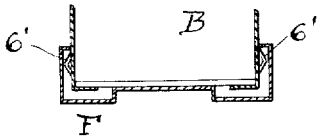
Figure 6:
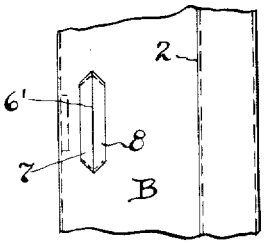

Fig. 1 is a transverse section through a support embodying the present invention; Fig. 2 is an enlarged detail taken on the plane indicated by the line II—II, Fig. 4; Figs. 3 and 4 are fragmentary front and side elevations respectively, the panel-locking member being removed; Fig. 5 is a sectional detail of a modification; and Fig. 6 is a side elevational detail of the same.

In its general aspects, the construction comprises a support with an automatically held panel-locking member. The body B of the support is made of any suitable material, but preferably of channel shaped sheet steel, and has shoulders 2 on as many of its faces as desired, usually on all, against which shoulders the panel members P of the wall engage. Tie members 5 advantageously are located at intervals between the margins of the body, being secured by welding or other suitable means. The panel-locking member F is of shallow channel shaped sheet metal, for instance steel, and presents shoulders 4, the edges being turned in so as to approach the sides of the body member. On the latter within the lines of the edges of the panel-locking member are projections 6, such that the edges of the panel-locking member resiliently snap over the projections and hold. These projections may be built on, or better are struck up from the body walls as elevations directed outwardly, and spaced at suitable intervals to provide secure holding. Where preferred, the projections may have a less abrupt back face where engaging the edges of a panel-locking member and the shape may include a double bevel or a bevel face forwardly as at 7 and backwardly as at 8.

Such support may be utilized in the holding of panel members for walls or partitions, either as horizontal or vertical elements, but the particular utility of the construction shown lies in its application as a vertical post, such post being ordinarily placed at spaced distances in accordance with the dimensions of the panels, such that the panels span between adjacently located posts or support members.

To assemble, the body B having been secured to the floor by any suitable means, and adjacent post bodies having been located as desired, panel members P are set in position against the shoulders 2 of adjacent post members, and the panel-locking member or closure plate F is pushed into position over the bevel face of the projections 6 and snaps into engagement behind the rear face thereof. In order to disassemble, the converse operations are carried out, it being necessary in this to pry or spread the edges of the panel-locking member sufficiently to allow removal over the projections 6. The panels may now be taken down or changed as desired.

As will thus be seen, the construction presents a simple and reliable means of assembly and securing of panel and support structures, and the use of bolts and screws to hold the face plate on the body of the post or support is rendered unnecessary.

Other modes of applying the principle of the invention may be employed, change being made as regards the features herein disclosed, provided the means stated by any of the following claims or the equivalent of such stated means be employed.

We therefore particularly point out and distinctly claim as our invention:—

1. In construction of the character described, a hollow sheet metal support open longitudinally, and a panel-locking face-cover therefor adapted to be held by resiliency.

2. In construction of the character described, a hollow sheet metal support having a longitudinal opening and catch-projections, such opening being formed by inward rebends on parallel flanges of the support, spaced ties bridging between the inward rebends on such flanges, and a panel-abutting face-cover having coacting projections, engagement being by resiliency.

3. In construction of the character described, a hollow sheet metal support of generally channel form having a recess in its web portion and shoulders on its flange portions, such flange portions being rebent toward each other to define a longitudinal opening therebetween, spaced ties bridging such flanges, and a face-cover having marginal portions for engaging said support by resiliency, the assemblage forming a square post with symmetrical recesses on opposite sides.

4. In construction of the character described, a hollow sheet metal support having a longitudinal opening, a channel-shaped sheet metal face-cover therefor of a width extending over and abutting the margin of a panel member therebehind and having angularly-turned edges, and integral projections on said body member for retaining such angularly-turned edges.

5. In construction of the character described, a hollow sheet metal support having a longitudinal opening, a channel-shaped sheet metal face-cover therefor having inturned edges, and stamped up projections on said body member for retaining such inturned edges.

6. In construction of the character described, a sheet metal support having a longitudinal opening, a channel-shaped sheet metal face-cover therefor having inturned edges, and bevel-faced projections on said body member for retaining such inturned edges.

7. In construction of the character described, a sheet metal support having a longitudinal opening, a channel-shaped sheet metal face-cover therefor having inturned edges, and double-beveled projections struck up on said support for retaining such inturned edges.

EARL F. HAUSERMAN.
LEROY D. MOWERY.
JOHN A. BOHNSACK.